(12) United States Patent  
Young et al.

(10) Patent No.: US 6,626,399 B2  
(45) Date of Patent: Sep. 30, 2003

(54) MINIATURE AIRCRAFT CATAPULT

(75) Inventors: Eric P. Young, Pasadena, CA (US); John Reynolds, Stevenson Ranch, CA (US); Mathew Curran, Lancaster, CA (US); Joseph Wurts, Valencia, CA (US); Danny Gast, Lancaster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/025,937

(22) Filed: Dec. 26, 2001

(65) Prior Publication Data

US 2003/0116677 A1 Jun. 26, 2003

(51) Int. Cl.[7] .................................................. B64F 1/06
(52) U.S. Cl. ......................................... 244/63; 446/65
(58) Field of Search .............................. 244/63, 114 R; 446/63, 64, 65; 89/1.801, 1.802, 1.803

(56) References Cited

U.S. PATENT DOCUMENTS 2,070,721 A    2/1937  Feight
2,611,355 A  *  9/1952  Ashwood ..................... 124/26
2,735,391 A  *  2/1956  Buschers ................... 89/1.802
2,765,582 A    10/1956 Hurtado
3,968,947 A  *  7/1976  Schlegel et al. .............. 244/63
4,238,093 A  * 12/1980  Siegel et al. .................. 244/63

OTHER PUBLICATIONS

Jane's Unmanned Aerial Vehicles and Targets 13, Dec. 10, 1999, IAT Launcher.*

* cited by examiner

*Primary Examiner*—Peter M. Poon
*Assistant Examiner*—Timothy D. Collins
(74) *Attorney, Agent, or Firm*—Bracewell & Patterson, LLP

(57) ABSTRACT

A catapult for launching an aircraft is disclosed including a rail assembly having first and second ends. A support structure is provided for supporting the rail assembly above the ground at various upward angles. A container having an open end is releasably mounted on the first end of the rail assembly, the container for mounting the aircraft therein with a portion of the front end of the aircraft extending out of the open end. A device is provided for extracting the aircraft from the container and moving it from the first end to the second end of the rail assembly and release it when reaching the second end.

32 Claims, 11 Drawing Sheets

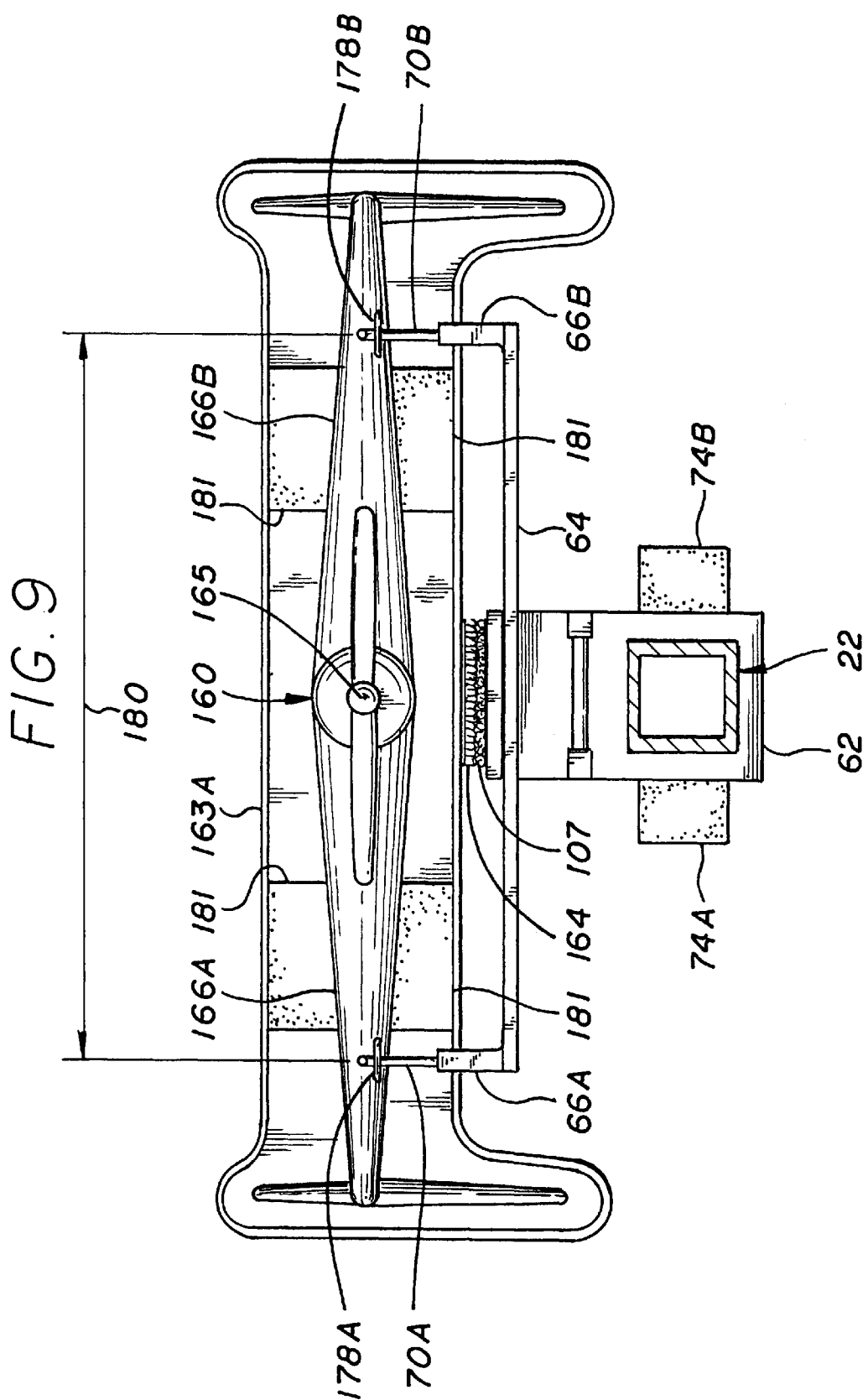

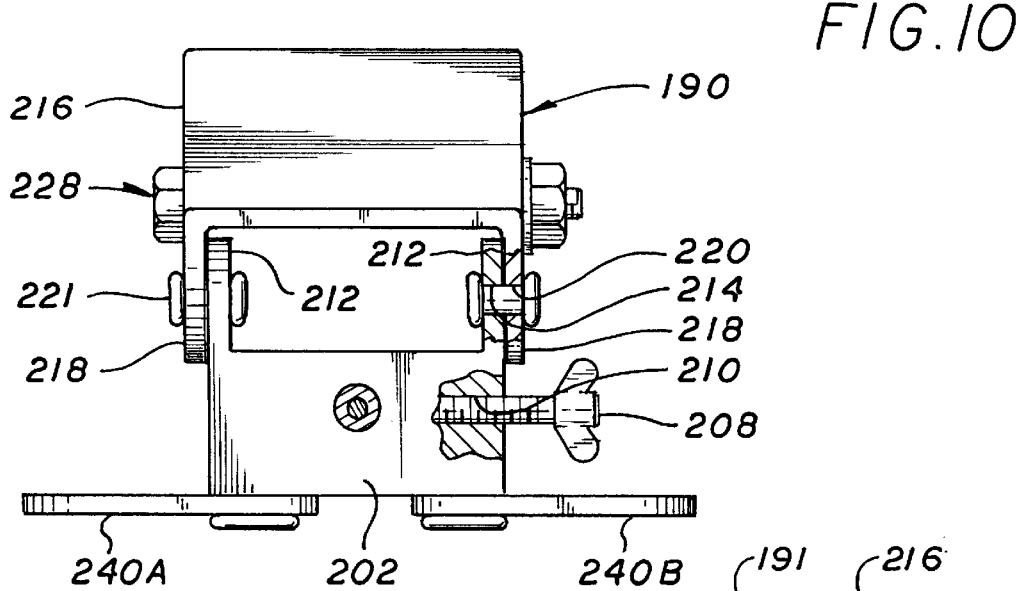
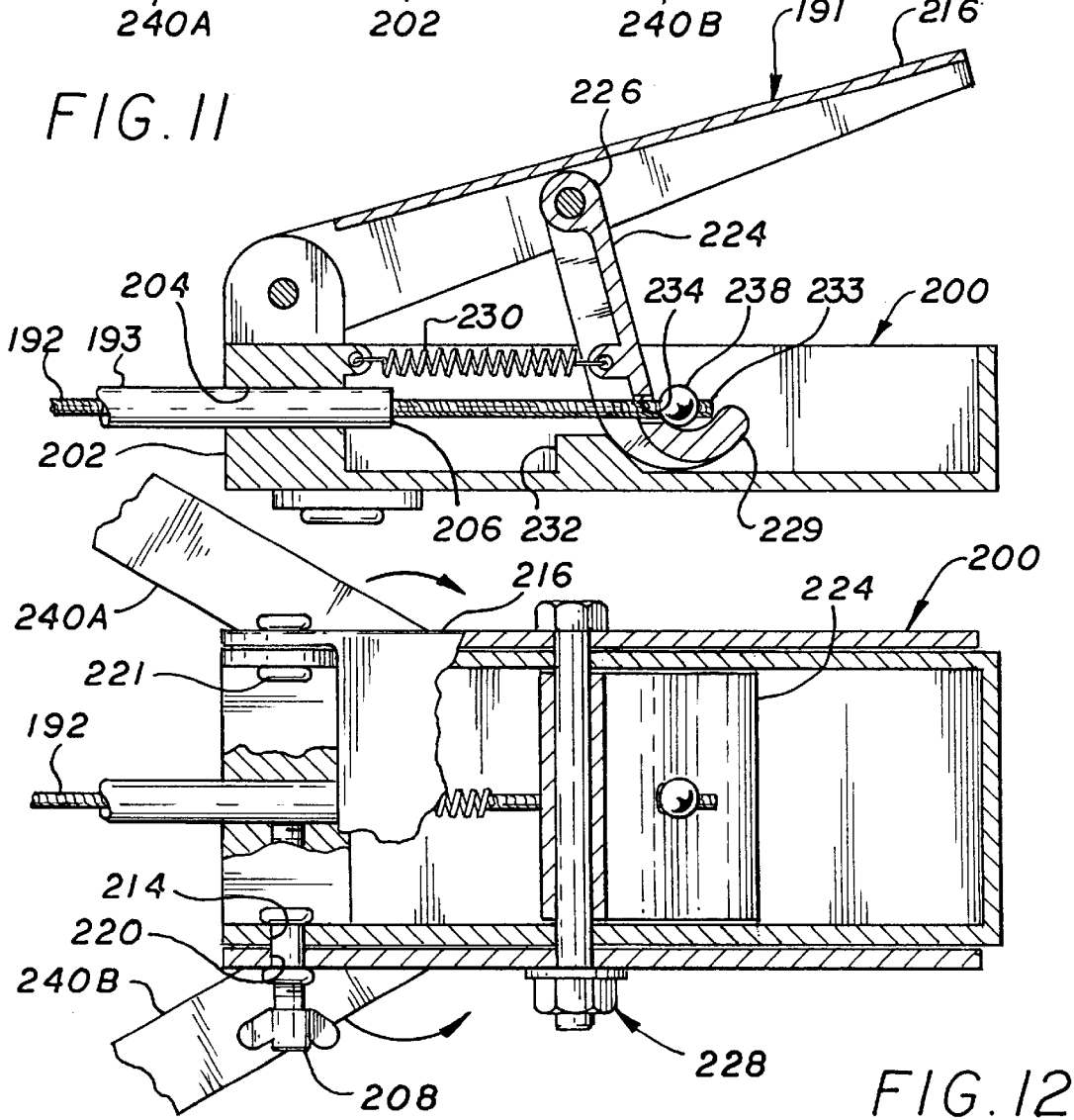

FIG. 13
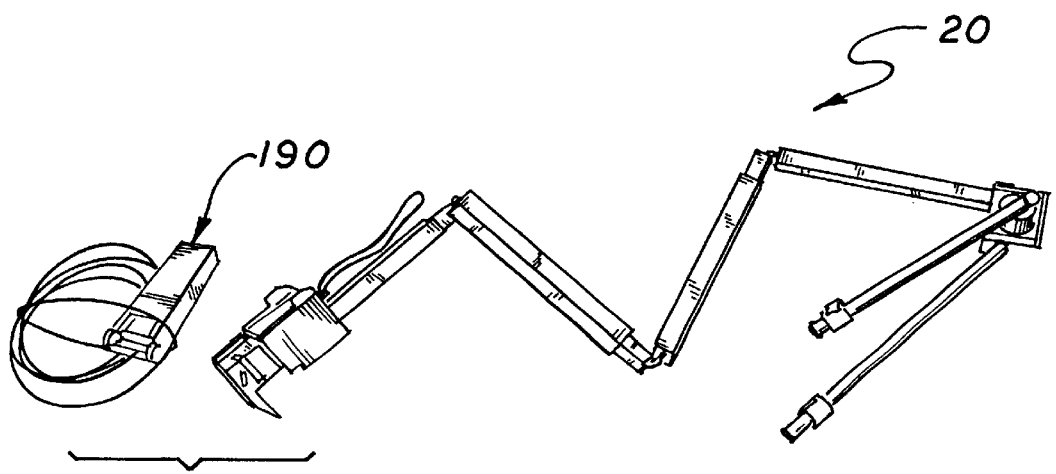
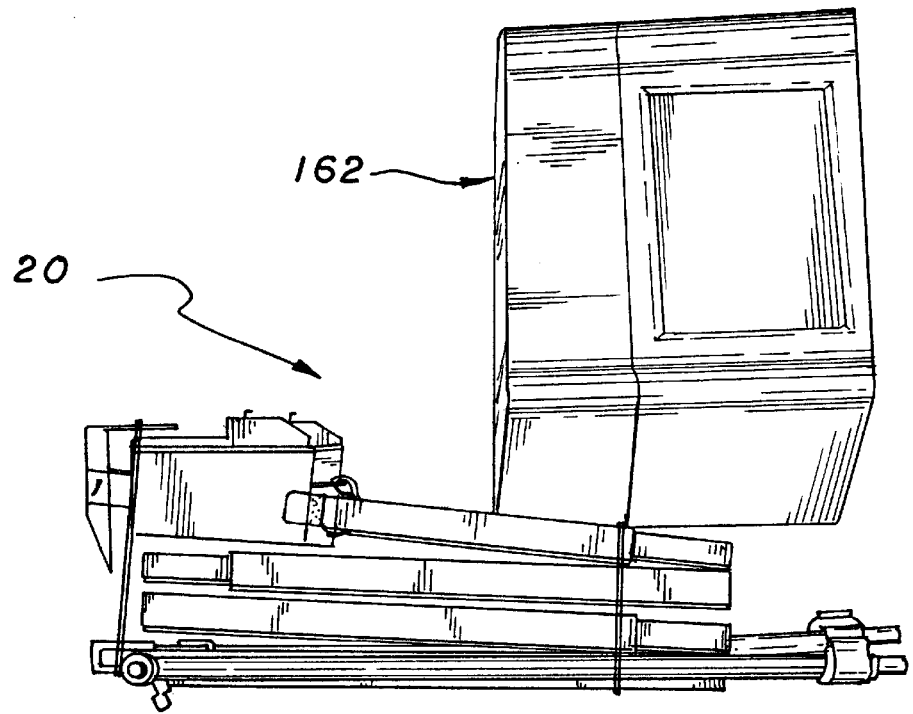
FIG. 14

MINIATURE AIRCRAFT CATAPULT

BACKGROUND OF THE INVENTION

Field of the Invention

The invention relates to the field of aircraft catapults and, in particular, to a portable catapult for micro or miniature aircraft.

Aircraft catapults are old in the art. In fact, a weight-activated catapult was used to launch the Wright brothers' first aircraft. Everything from hydraulic to steam has been used to launch aircraft from aircraft carriers. However, most practical catapults are designed for use with aircraft having landing gear. If the aircraft has no landing gear attaching the catapult to the aircraft can prove difficult. However, if operated in areas where no landing field is available, such as in rugged mountain terrain, the landing gear would be useless for recovery and a parachute recovery system must used.

With small model aircraft, an inexpensive approach is to toss the aircraft into the air by hand. Another approach is a simple rod with a rubber band that is attached to a notch on the fuselage of the aircraft. However, these "catapults" have been used primarily with flat balsa wood "cutouts" type models weighing only a few ounces. With anything larger, such methods are unlikely to work because of handling difficulties. In addition, any catapult should allow for hand free operation so the operator's hands are free to operate a radio control console. Furthermore, any such catapult should be light in weight and collapsible for storage and carrying purposes.

Thus, it is a primary object of the invention to provide a catapult system for an aircraft that is simple to set up.

It is another primary object of the invention to provide a catapult system for an aircraft such that the aircraft remains protected until actual launch.

It is a further object of the invention to provide a catapult system for an aircraft that allows hands free operation so that the operator can use both hands to operate a remote control.

It is a still further object of the invention to provide a catapult system for an aircraft that is inexpensive to manufacture.

It is still another object of the invention to provide a catapult system for an aircraft that can be stored in a compact package.

SUMMARY OF THE INVENTION

The invention is an aircraft catapult assembly. In detail, the assembly includes a rail having first and second ends with a support system for supporting the rail above the ground at various upward angles. Preferably, this support system includes a pair of telescoping support members at the second end and a fitting at the first end having a stake for driving in the ground for locking the rail in place. An aircraft container having an open end is releasably mounted on the first end of the rail such that the leading edges of the wings of the aircraft extend out of the container.

An aircraft towing assembly is movably mounted on the rail, which is movable from the first end to the second end. An attachment device is used to releasably connect the wings of the aircraft to the aircraft towing assembly. Thus as the aircraft towing assembly is moved from the first to the second end of the rail, the aircraft is towed there along and released when the towing assembly reaches the second end.

A stop member at the second end of the rail prevents the towing assembly from moving further. Preferably, this attachment device includes first and second wire loops mounted on the leading edge of the left and right wings of the aircraft and the towing assembly includes first and second hooks mounted thereon for releasably engaging these first and second wire loops.

A locking device is provided for releasably holding the towing assembly at the first end of the rail. The locking device includes a loop of rope having first and second ends, with the first end attached to the towing assembly. A cable operated release assembly is coupled to the fitting at the first end of the rail. This cable operated release assembly includes a pin having a first position in engagement with the second end of the loop of rope and a second position out of engagement therewith. A foot petal operated cable is coupled to the pin for moving the pin out of engagement with the loop of rope.

A pair of bungee cords are attached to the towing assembly and extend to the second end of the rail and about a pulley mounted at this point and extends partially back to the first end. A cord is attached to the bungee cord having a plurality of spaced apart knots thereon. The fitting at the first end of the rail includes a notch wherein the cord can be inserted and one of the knots will prevent the cord from moving. Thus, the cord can be used to apply a tension load to the bungee cords and the cord can be attached to the fitting by placing the cord in the notch.

Preferably, the rail is composed of a plurality of hollow interlocking segments and an elastic cord is mounted within the interlocking segments and attached to the first and second ends thereof for releasably holding the segments in the interlocking position. In addition, the telescoping supports on the second end of the rail are pivotally mounted thereto and thus they can be folded along the rail. In addition, the cable and foot petal can be disconnected from the fitting and the container can be removed. This allows the rail assembly to be folded into a compact shape for storage.

To "arm" the catapult, the cord is pulled tight and locked in place by "hooking" one of the knots into the notch in the fitting. The support members at the second end of the rail are extended and the stake is driven into the ground. Thereafter, the carrying case with the aircraft installed therein is attached to the fitting at the first end of the rail. The wire loops are attached to the hooks on the towing assembly. At this point the aircraft is ready to launch. The operator presses on the foot petal causing the cable to retract, releasing the loop of rope. The towing assembly is then pulled down the rail.

As this occurs, the aircraft is pulled out of the carrying case and transported down the rail. When the towing assembly gets to the end of the rail at the second end and contacts the stop, the hooks automatically separate from the wire loops and the aircraft is catapulted into the air. The operator can thereafter start the motor and guide the aircraft by means of a radio control system. Of course the motor could be started prior to launch.

The novel features which are believed to be characteristic of the invention, both as to its organization and method of operation, together with further objects and advantages thereof, will be better understood from the following description in connection with the accompanying drawings, in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 9 is a cross-section view of FIG. 8 taken along the line 8—8.

FIG. 10 is a front view of the foot petal assembly used to release the aircraft.

FIG. 11 is a side view of the foot petal assembly shown in FIG. 10 partially broken away to show the interior thereof.

FIG. 12 is a top view of the foot petal assembly shown in FIG. 10 partially broke away to show the interior thereof.

FIG. 13 is a view of the catapult partially disassembled.

FIG. 14 is a view of the catapult in the stored condition.

DESCRIPTION OF THE PREFERRED EMBODIMENT

Figure 1:
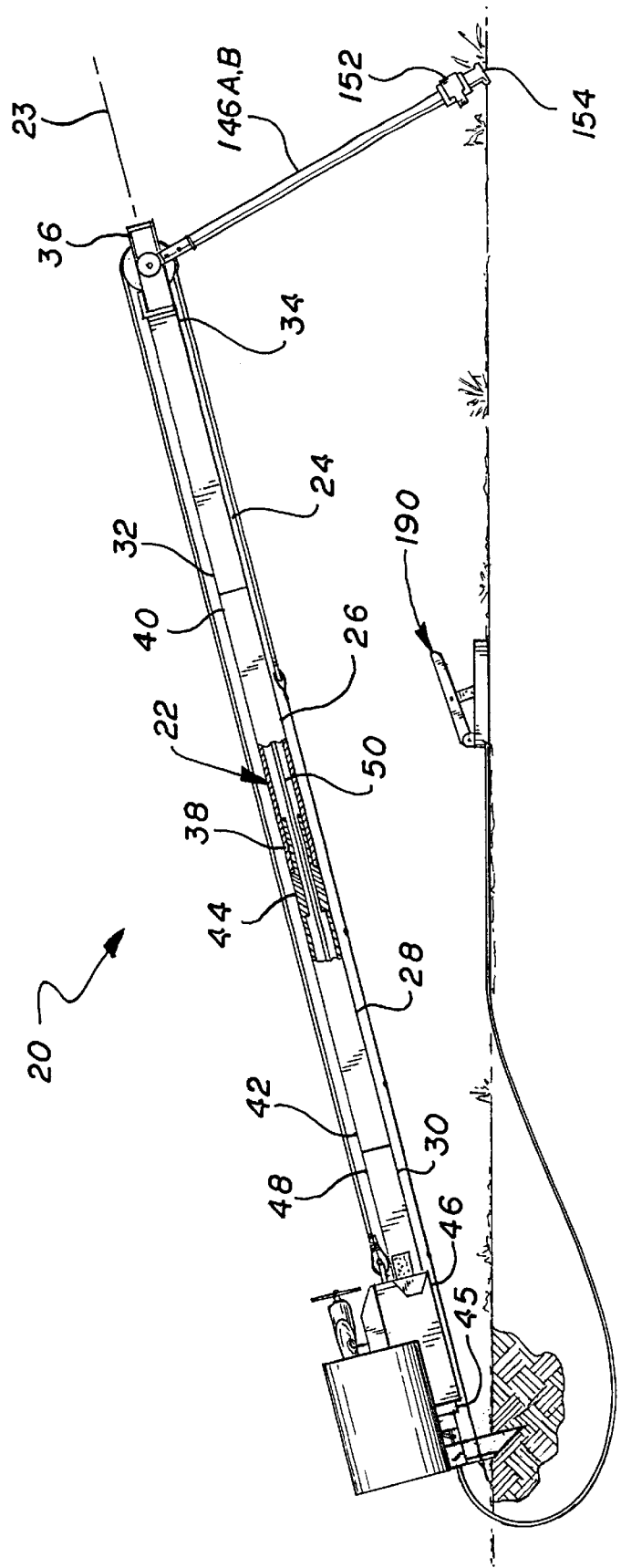
FIG. 1 is a side view of the catapult.
Figure 2:
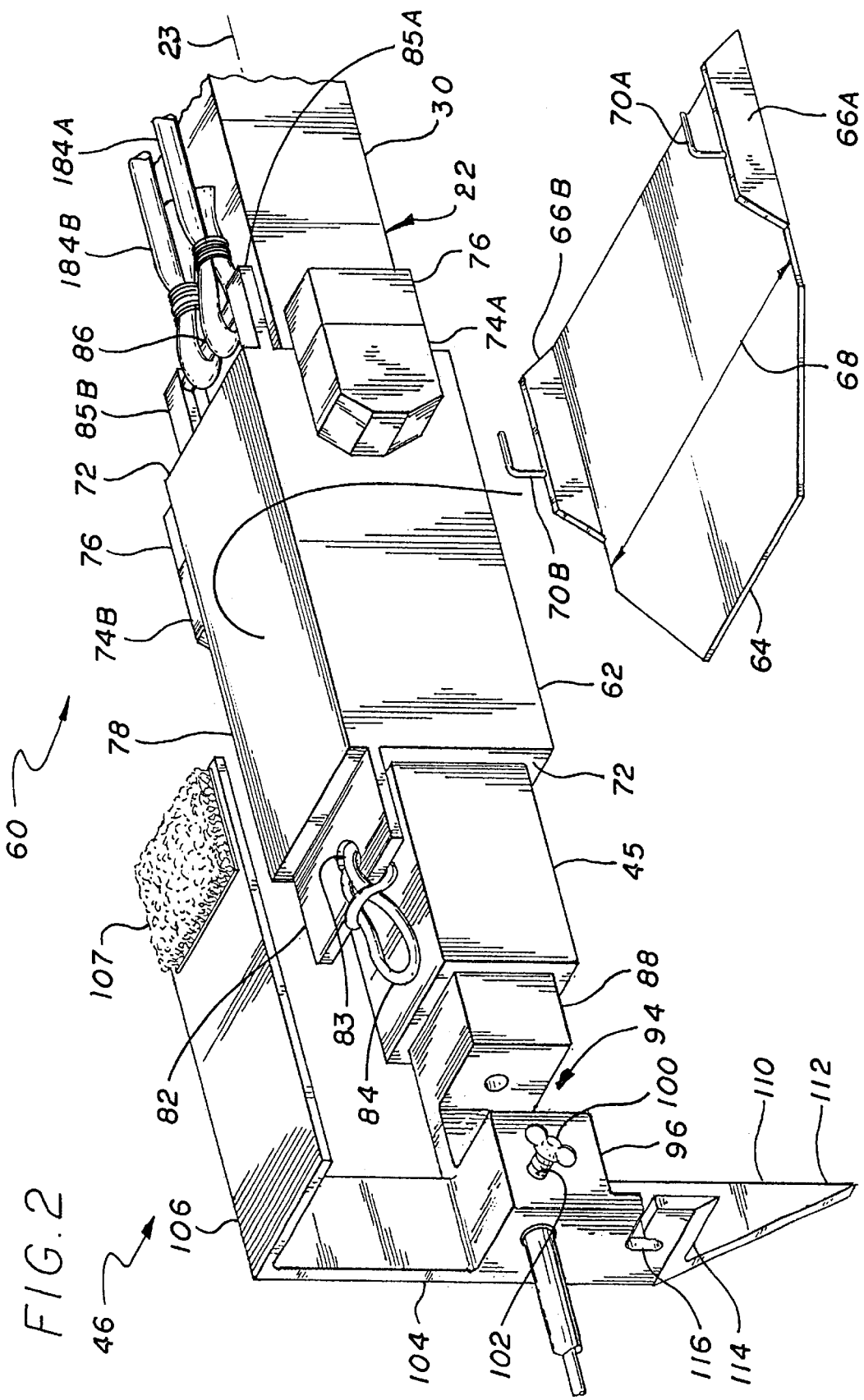
FIG. 2 is a partial perspective view of the rear end of the catapult.
Figure 3:
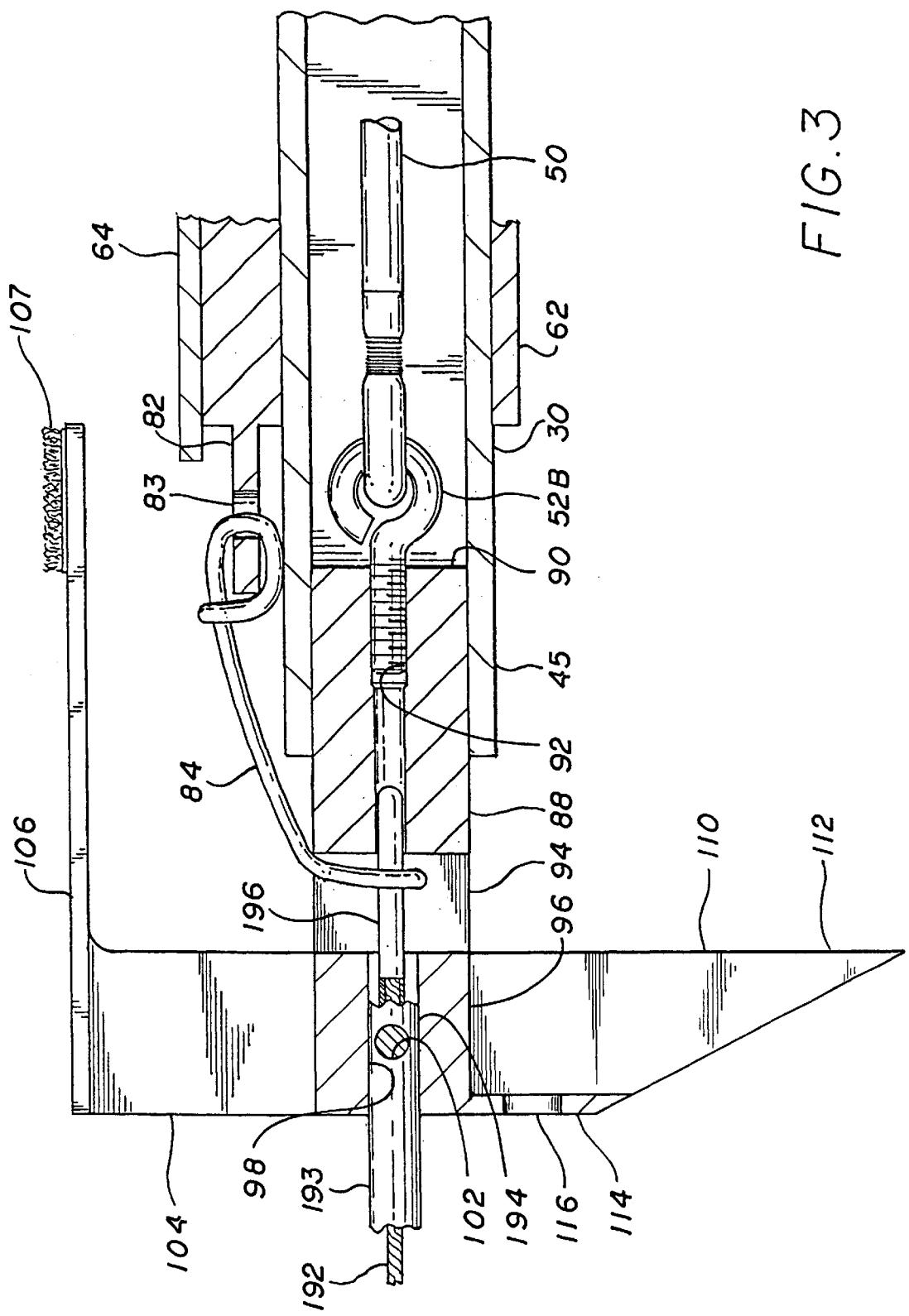
FIG. 3 is a partial cross-section view of the rear end of the catapult show in FIG. 2.

Referring to FIGS. 1–4, the catapult, generally designated by numeral 20 includes a rail assembly 22, having a longitudinal axis 23, composed of four interlocking sections, 24, 26, 28 and 30. These four sections 24–30 are all hollow and square in cross-section. The section 24 includes a first end 32 and a second end 34 having a fitting 36 inserted therein; the details of this fitting 36 will be subsequently discussed. The section 26 includes a first end 38 and a second end 40 having a reduced cross-section that mates with the interior of the end 32 of the first section 24. The intermediate section 28 also includes a first end 42 and a second reduced cross-section second end 44 that mates with the interior of the end 38 of section 26. Finally, the section 30 includes a second end 45 having a member 46 installed therein, which will be subsequently discussed. The section 30 also includes a reduced cross-section end 48 that mates with the interior of the end 42 of the section 28. A bungee cord 50 is mounted within the rail assembly 22 and is attached to the fittings 36 and 46 by means of hook 52A and 52B, respectively. Thus the sections 24–30 are held together under a "spring" load but can be separated and folded for storage purposes, which will be subsequently discussed.

An aircraft towing member 60 is slidably mounted to the rail assembly 22 by means of an integral bushing 62. The towing member 60 includes a plate 64 mounted on top of the bushing ±62 having a pair of thin vertical plates 66A and 66B spaced symmetrically on each side of the longitudinal axis 23 at a distance 68 from each other. The plat 64 can be bonded to the bushing 62 or joined by fasteners (not shown). Hooks 70A and 70B are mounted on top of the vertical plates 66A and 66B, respectively. The front end 72 of the bushing 62 includes stop members 74A and 74B incorporating resilient bumpers 76. The top of the rear end 78 of the bushing 62 includes a flange 8e having a hole 83, which incorporates a loop of rope 84 therethrough. A pair of arms 85A and 85B extend from the front end 72 of the bushing 62 having a pin 86 mounted therebetween.

The member 46 mounted to the end 45 of the section 30 of the rail assembly 22 includes a plug portion 88 extending within the section 30 and bonded thereto and has a first end 90 having a partially threaded hole 92 in which the hook 52B is threadably engaged therewith. The plug portion 88 includes a notch 94. The end 96 of the plug portion 88 includes a hole 98. A thumbscrew 100 is installed in a second threaded hole 102 that intersects the hole 98. A vertical plate 104 extends upward from the side of the end 96 of the plug portion 88 and is connected to a horizontal plate 106 that extends over the plug portion forward of the notch 94. A half of a loop and hook type fastener 107 is mounted to the top of the horizontal plate 106. A vertical member 110 extends downward from the plug member 88 and has a sharpened end 112, which acts as a spike for driving into the ground. A flange portion 114 extends at a right angle to the vertical member 110 that incorporates a notch 116. Due to the complex shape of the member 46, it is best made from a metal casting.

Figure 4:
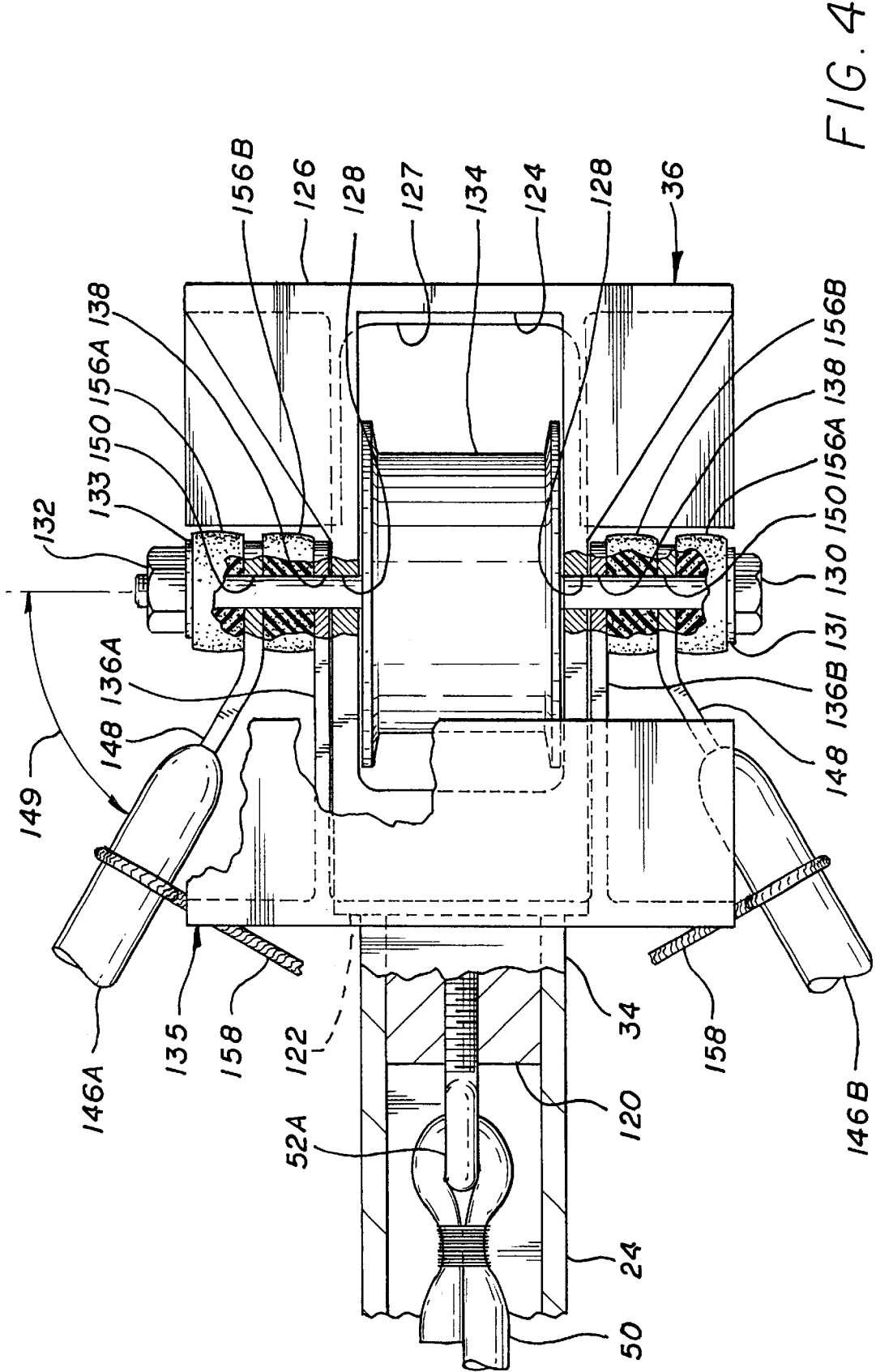
FIG. 4 is a partial top view of the catapult shown in FIG. 1 illustrating the front end of the catapult.
Figure 5:
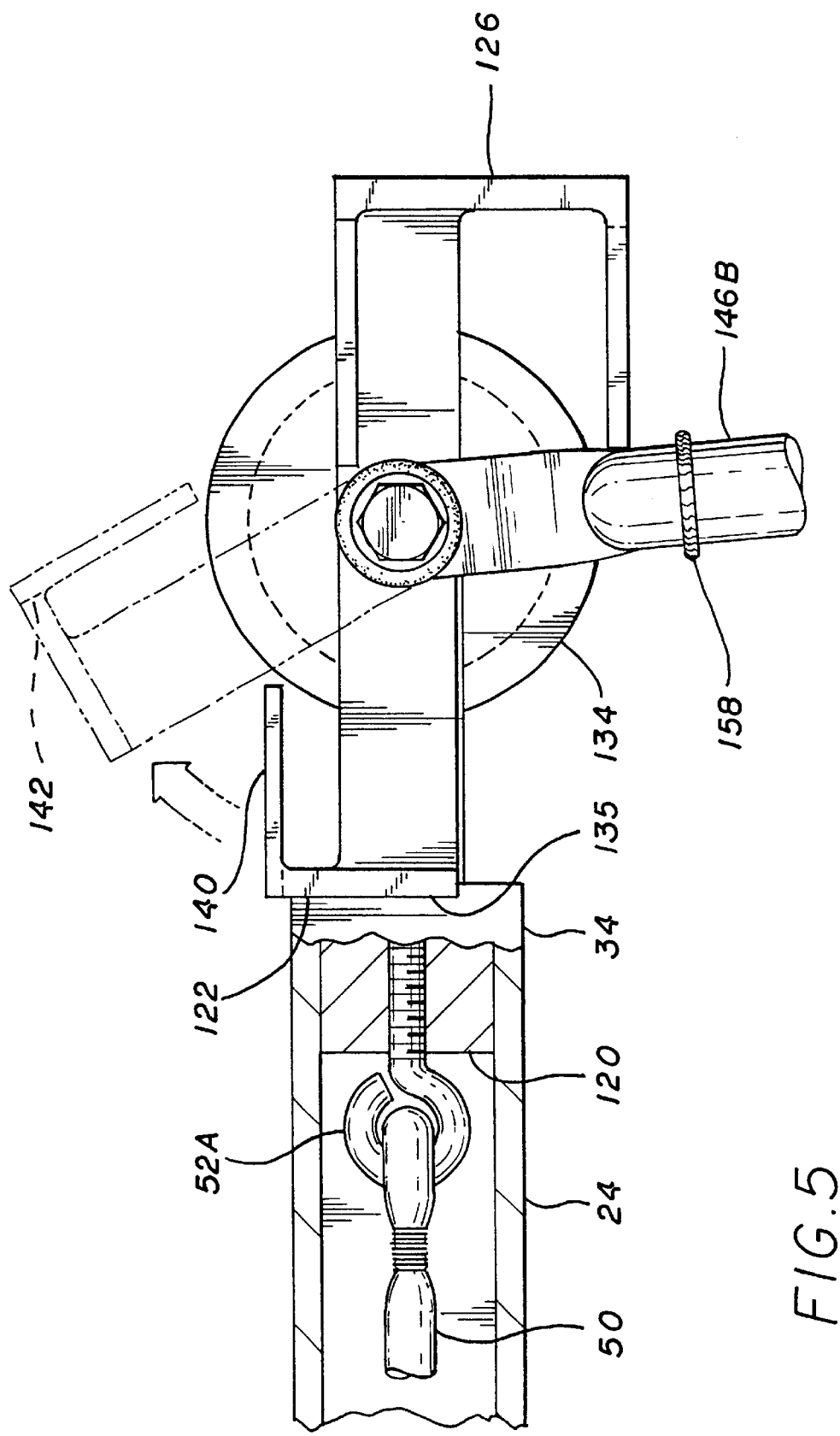
FIG. 5 is a side view of the catapult shown in FIG. 1 illustrating the front end of the catapult.
Figure 6:
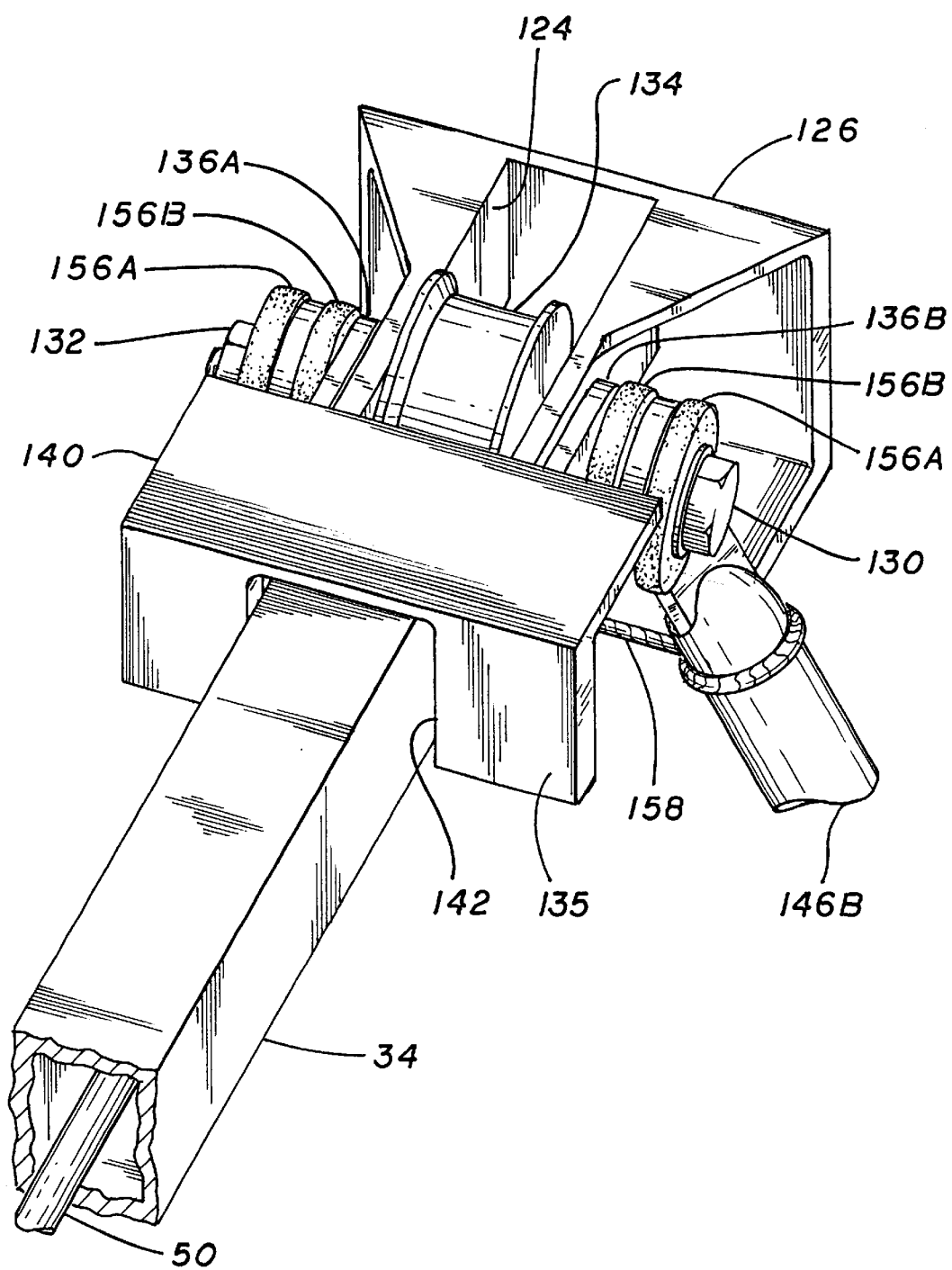
FIG. 6 is a partial perspective view of the front end of the catapult shown in FIG. 1.
Figure 7:
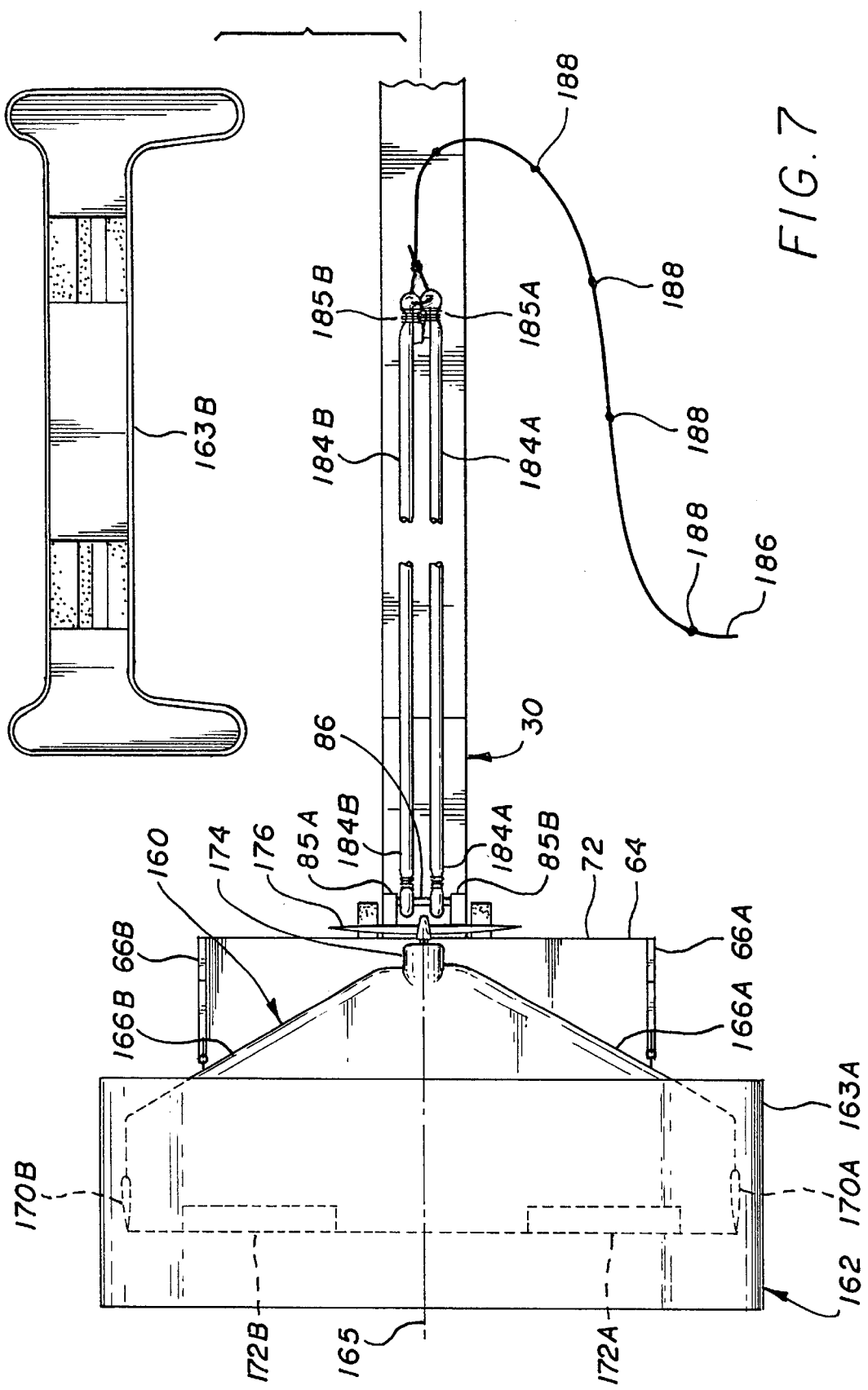
FIG. 7 is a partial top view of the catapult shown in FIG. 1 illustrating the aircraft and carrying case therefore mounted on the aircraft-towing member.
Figure 8:
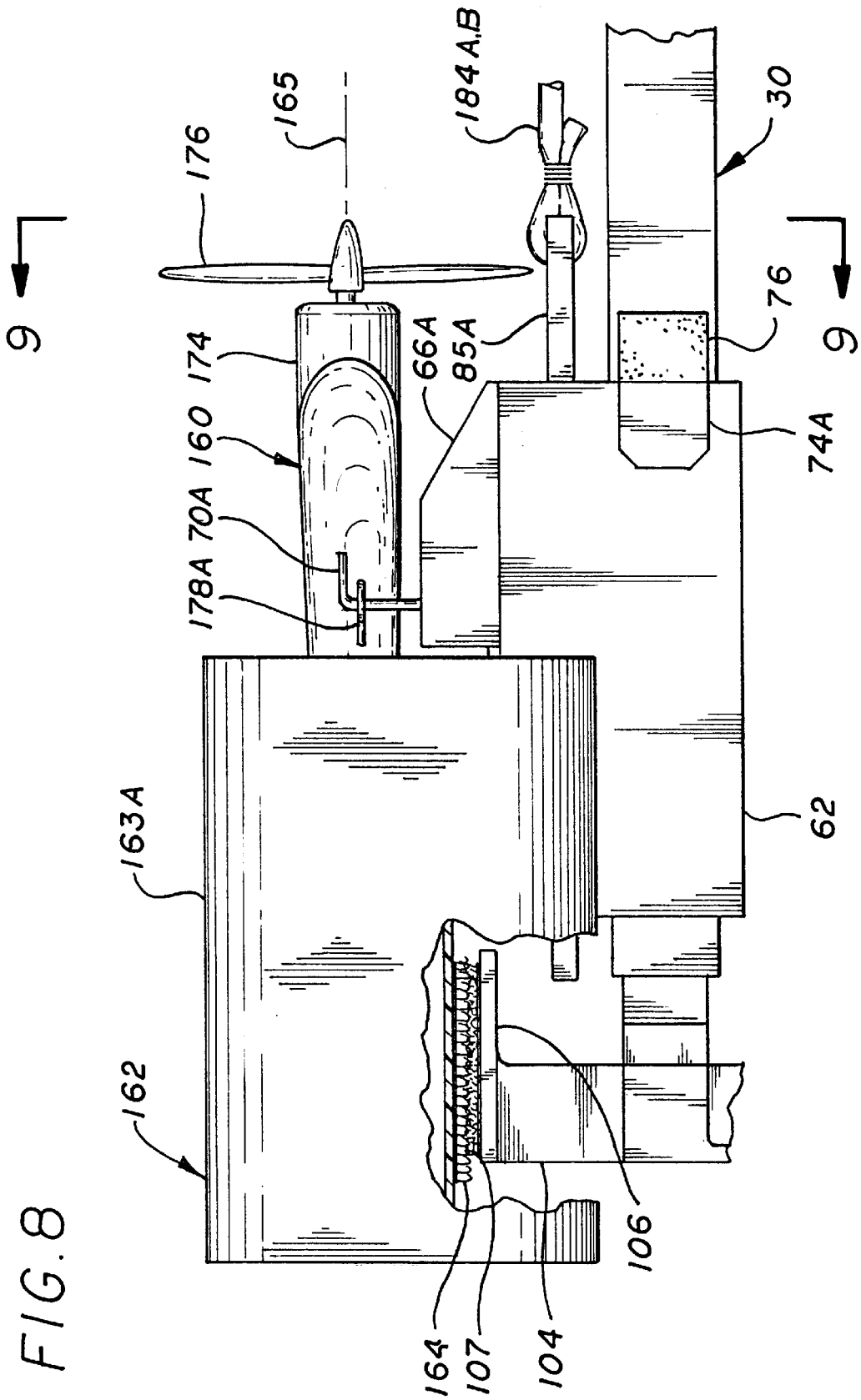
FIG. 8 is a side view of FIG. 6.

Still referring to FIGS. 1–4 and additionally to FIGS. 4–6, the fitting 36 includes a plug portion 120 that extends into the end 34 of the section 24 of the rail assembly 22 and is bonded thereto. The hook 52 is attached to the plug portion 120. A shoulder 122 on the fitting 36 abuts the end 34 of the section 24. The fitting 36 includes a slot 124 and flanged end 126 having a notch 127. A hole 128 extends through the sides of the fitting in the region of the slot 124. A stop member 135 for the bushing 62 is rotatably mounted on the bolt outside of the fitting 36. Forked members 136A and 136B having bolt holes 138 through which the bolt 130 extends rotatably, mount the stop member to the fitting 36. The forked members 136A and 136B are joined by a flange 140 that includes a notch 142.

Thus the stop member 135 can be rotated over the section 24 of the rail assembly 22 such that section 24 fits into the notch 142 and the flange 140 extends perpendicular or at right angles to the section 24 of the rail assembly 22. As will be subsequently discussed, in this position it can stop the aircraft towing member 60 as it is pulled down the rail assembly 22 and the stop members 74A and 74B contact the flange 135. It is believed that the fitting 36 and stop member 135 would best be manufactured as a casting, because of their complex shapes.

Also rotatably mounted to the bolt 130 are telescoping supports 146A and 146B, typical of those found on camera tripod supports. The supports 146A and 146B include end fittings 148 bent at an acute angle 149 having holes 150 for engaging the bolt 130 there through. The telescoping supports 146A and 146B include locking devices 152 for setting the length and pads 154 for contact with the ground. Such supports are old in the art and need not be discussed in further detail. Mounted on either side of the end fittings 148 are rubber bushings 156A and 156B. These bushings 156A and 156B allow the supports 146A and 146B to be collapsed about the rail assembly 22 for storage purposes. A cable 158 is attached between the supports 146A and 146B to limit separation from each other.

Referring to FIGS. 1–9, the aircraft 160 is initially mounted with a two part carrying case 162, the main portion 163A supporting the airplane and the cover 163B. The main portion 163A of the case 162 incorporates a second half of a hook and loop type fastener 164. The aircraft 160 is a flying wing design having a longitudinal axis 165, wings 166A and 166B, rudders 170A and 170B, elevons 172A and 172B, a front end mounting a motor 174 for driving a propeller 176. Wire loops 178A and 178B are installed in the leading edge of the wings 166A and 166B spaced apart a distance 180 equal to the distance 68 of the vertical plates 66A and 66B the aircraft 160 is supported by a plurality of foam pads 181 within the main portion 163A of the carrying case 162 such that the aircraft can be easily withdrawn.

A pair of bungee cords 184A and 184B are tied to the pin 86 at the end 72 of the bushing 62 and at their second end 185A and 185B tied to a cord 186. The cord 186 includes a series of knots 188 spaced along its length. The bungee cords 184A and 184B extend down the rail assembly 22, over the pulley 134 and back along the underside of the rail assembly.

Referring to FIGS. 3 and 10–12, a foot petal operated cable release assembly 190 is provided and includes a foot petal assembly 191 having a flexible cable 192 movably mounted within a cable carrier 193. The end 194 of the cable carrier 193 is inserted into the hole 98 of plug portion 88 and is secured therein by the thumbscrew 100. The end of the cable 192 terminates in a rigid rod 196 that has the closed loop of rope 84 thereabout and extends into hole 92. Thus aircraft-towing member 60 can be held in place at the first end of the rail assembly 22.

The foot petal assembly 192 includes an open toped container 200 having a front wall 202. The front wall 202 includes a hole 204 therethrough for receiving the end 206 of the cable carrier 193. A thumbscrew 208 mounted in threaded hole 210 is in communication with hole 204. Thus the cable carrier 194 can be secured to the container 200. A pair of lugs 212 extend upward from the front wall 202 having holes 214. A lever arm 216 includes a pair of lugs 218 also having holes 220 therethrough. Fasteners 221 secure the lever arm 216 to the container 200. A beam 224 is pivotally attached by its first end 226 to the lever arm 216 by means of a fastener assembly 228, with the second end 229 ending in a curved surface in contact with the bottom of the container 200. A spring 230 is attached to the front wall 202 and beam 224 biasing the beam toward the front wall. A stop member 232 mounted to the container floor limits forward movement.

The end 233 of the cable 192 extends through a hole 234 in the beam 224 and is secured thereto by means of a retainer 238 clamped about the end securing it thereto. A pair of arms 240A and 240B are pivotally mounted to the underside of the container 200, which can be extended to provide support so that any tendency to tip over is eliminated when the foot petal assembly is actuated. Referring to FIGS. 1–4, it can be seen when the operator steps on the lever are 216, the beam 224 will move away from the front wall pulling the cable 192. This of course will remove the pin 196 from the hole 92 releasing the loop of rope 84.

Referring to FIGS. 1–12, to "arm" the catapult 20, the cord 186 is pulled tight and locked in place by "hooking" one of the knots 188 into the notch 116 in the flange portion 114 of the vertical member 110. The supports 146A and 146B are extended so that the front end of the assembly 20 is raised and the sharpened end 112 of the vertical member 110 is driven into the ground.

Thereafter, the main portion 163A of the carrying case 162 with the aircraft 160 installed therein is placed on the flat plate 64 of the aircraft towing member 60 such that the second half 164 of the hook and loop fastener is joined to the first half 107 locking it to the fitting 46. The wire loops 178A and 178B are attached to the hooks 70A and 70B on the vertical plates 66A and 66B. At this point the aircraft 160 is ready to launch. The operator (not shown) presses on the foot petal causing the cable 192 to retract, releasing the rope 84. The towing member 60 is then pulled down the rail assembly 22.

As this Occurs, the aircraft 160 is pulled out of the main portion 163A of the carrying case 162 and it rides on the flat plate 64 from the first end to the second end of the rail assembly 22. When the stop members 74A and 74B hit the stop plane 135, the hooks 70A and 70B automatically separate from the wire loops 178A and 178B and the aircraft is catapulted off the plate 64 and into the air. The resilient bumpers 76 cushion the impact. The operator can thereafter start the motor and guide the aircraft via a radio control system (not shown). The use of the foot petal operated release system 190 allows both hands to be used to operate the radio controls. Of courses, the motor could be started prior to launch.

To store the catapult 20, the main portion 163A carrying case 162 is removed from the towing member 60, the aircraft 160 is installed and the cover 163B placed thereover. The cable carrier 193 is disconnected from the member 46 and the bungee cords 184A and 184B are disconnected from the member 36. Referring to FIGS. 13 and 14, the segments 24, 26, 28 and 30 of the rail assembly 22 are then disconnected and folded. Thereafter, the bungee cords and cord 186 can be wrapped around the fully folded rail assembly.

The advantage of the subject catapult system is that it is simple to set up and operate. The aircraft essentially remains protected in a carrying case until launched. Furthermore, the use of a foot petal operated release system frees both hands of the operator. The launch force can be easily adjusted by varying the amount of tension in the bungee cords. In addition, the initial trajectory of the aircraft can be varied. It also folds up into a compact package for storage. Finally, it is inexpensive to manufacture.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to the aircraft industry.

What is claimed is:

1. An aircraft catapult assembly comprising, a rail having first and second ends;

support means for supporting said rail above the ground at various upward angles;

an aircraft towing assembly movably mounted on said rail, said towing assembly movable from said first end to said second end of said rail, first means for releasably connecting the wings of the aircraft to said aircraft towing assembly such that as said aircraft towing assembly is moved from said first end of said rail to said second end, the aircraft is towed there along and released when said towing assembly reaches said second end of said rail;

an aircraft container having an open end for releasably mounting the aircraft directly therein such that the leading edge of the wing of the aircraft extends out of the container, said container releasably mounted to said first end of said rail;

second means to releasably hold said towing assembly at said first end of said rail;

biasing means for urging said aircraft towing assembly toward said second end of said rail; and such when said second means releases said aircraft towing assembly, said towing assembly is moved from said first end to said second end of said rail and the aircraft is moved along therewith and is released by said first means.

2. The catapult as set forth in claim 1 wherein the aircraft includes a longitudinal axis and further includes left and right wings, said fist means comprising;

first and second wire loops mounted on the leading edge of the left and right wings of the aircraft; and first and second hooks mounted on said aircraft towing assembly for releasably engaging said first and second wire loops.

3. The catapult as set forth in claim 2 wherein said first end of said rail includes a fitting comprising:

means for releasably attaching said container thereto; and means for securing said first end of said rail to the ground.

4. An aircraft catapult assembly for launching an aircraft comprising:

a rail having first and second ends;

support means for supporting said rail above the ground at various upward angles;

an aircraft towing assembly movably mounted on said rail, said towing assembly movable from said first end to said second end of said rail;

first means for releasably connecting the wings of the aircraft to said aircraft towing assembly such that as said aircraft towing assembly is moved from said first end of said rail to said second end, the aircraft is towed there along and released when said towing assembly reaches said second end of said rail;

an aircraft container having an open end for releasably mounting the aircraft therein such that the leading edge of the wing of the aircraft extends out of the container, said container releasably mounted to said first end of said rail;

second means to releasably hold said towing assembly at said first end of said rail;

biasing means for urging said aircraft towing assembly toward said second end of said rail;

such when said second means releases said aircraft towing assembly, said towing assembly is moved from said first end to said second end of said rail and the aircraft is moved along therewith and is released by said first means;

wherein the aircraft includes a longitudinal axis and left and right wings;

wherein the first means comprises:
first and second wire loops mounted on the leading edge of the left and right wings of the aircraft; and
first and second hooks mounted on said aircraft towing assembly for releasably engaging said first and second wire loops;

wherein said first end of said rail includes a fitting comprising:
means for releasably attaching said container thereto; and
means for securing said first end of said rail to the ground; and wherein said second means comprises:
a rope loop having first and second ends, said first end attached to said towing assembly;

a cable release assembly coupled to said fitting, said cable release assembly having a pin, said pin having a first position in engagement with said rope loop and a second position out of engagement with said rope loop; and means to move said pin from said first position to said second position.

5. The catapult as set forth in claim 4 wherein said cable release assembly further includes:

a cable coupled to said pin; and a foot pedal coupled to said cable such that when said foot pedal is depressed, said cable moves said pin to said second position.

6. The catapult as set forth in claim 5 comprising:

a pulley mounted on said second end of said rail;

at least one bungee cord attached to said towing assembly and extendable to said second end of said rail and about said pulley and at least partially back to said first end of said rail; and means to secure said at least one bungee cord to said fitting at said first end of said rail.

7. The catapult as set forth in claim 6 wherein said means to secure said at least one bungee cord to said fitting at said first end of said rail comprises:

a notch on said fitting; and a cord attached to said at least one bungee cord, said cord having a plurality of spaced apart knots larger than said notch;

such that said cord can be used to apply a tension load to said at least one bungee cord and the cord can be attached to said fitting by placing said cord in said notch.

8. The catapult as set forth in claim 7 wherein support means for supporting said rail above the ground at various upward angles includes:

said second end of said rail includes a pair of telescoping support members; and said fitting includes a stake for driving in the ground.

9. The catapult as set forth in claim 8 comprising:

said rail composed of a plurality of hollow interlocking segments; and an elastic cord mounted within said interlocking segments and attached to said first and second ends thereof for releasably hold in said segments in said interlocking position;

having a platform for supporting the aircraft as said towing assembly moves from said first end such that said segments can be pulled apart and folded.

10. The catapult as set forth in claim 4, including said aircraft towing assembly having a platform for supporting the aircraft as said towing assembly moves from said first end to said second end of said rail.

11. A catapult for launching an aircraft comprising;

a rail assembly having first and second ends;

support means for supporting said rail assembly above the ground at various upward angles;

a container having an open end releasably mounted directly on said first end of said rail assembly, said container for mounting the aircraft directly therein with a portion of the front end of the aircraft extending out said en end; and means to launch the aircraft from said container and by moving from said first end to said second end of said rail assembly and release it when reaching said second end.

12. The catapult assembly as set forth in claim 11 wherein means to extract the aircraft from said container and move it from said first end to said second end of said rail assembly and release it when reaching said second end comprising:
an aircraft towing assembly movably mounted on said rail, said towing assembly movable from said first end to said second end of said rail,
first means for releasably connecting the wings of the aircraft to said aircraft towing assembly such that as said aircraft towing assembly is moved from said first end of said rail to said second end, the aircraft is towed there along and released when said towing assembly reaches said second end of said rail;
second means to releasably hold said towing assembly at said first end of said rail;
biasing means for urging said aircraft towing assembly toward said second end of said rail; and
such when said second means releases said aircraft towing assembly, said towing assembly is moved from said first end to said second end of said rail and the aircraft is moved along therewith and is released by said first means.

13. The catapult as set forth in claim 12 wherein the aircraft includes a longitudinal axis and further includes left and right wings, said first means comprising;
first and second wire loops mounted on the leading edge of the left and right wings of the aircraft; and
first and second hooks mounted on said aircraft towing assembly for releasably engaging said first and second wire loops.

14. The catapult as set forth in claim 13 wherein said first end of said rail includes a fitting comprising:
a fastener for releasably attaching said container thereto; and
a stake for securing said first end of said rail to the ground.

15. A catapult for launching an aircraft comprising:
a rail assembly having first and second ends;
support means for supporting said rail assembly above the ground at various upward angles;
a container having an open end releasably mounted on said first end of said rail assembly, said container for mounting the aircraft therein with a portion of the front end of the aircraft extending out said open end;
means to extract the aircraft from said container and move it from said first end to said second end of said rail assembly and release it when reaching said second end comprising:
an aircraft towing assembly movably mounted on said rail, said towing assembly movable from said first end to said second end of said rail,
first means for releasably connecting the wings of the aircraft directly to said aircraft towing assembly such that as said aircraft towing assembly is moved from said first end of said rail to said second end, the aircraft is towed there along and released when said towing assembly reaches said second end of said rail;
second means to releasably hold said towing assembly at said first end of said rail;
biasing means for urging said aircraft towing assembly toward said second end of said rail;
such when said second means releases said aircraft towing assembly, said towing assembly is moved from said first end to said second end of said rail and the aircraft is moved along therewith and is released by said first means;
wherein the aircraft includes a longitudinal axis and left and right wings;
wherein said first means comprises:
first and second wire loops mounted on the leading edge of the left and right wings of the aircraft; and
first and second hooks mounted on said aircraft towing assembly for releasably engaging said first and second wire loops;
wherein said first end of said rail includes a fitting comprising:
a fastener for releasably attaching said container thereto; and
a stake for securing said first end of said rail to the ground; and
wherein said second means comprises:
a rope loop having first and second ends, said first end attached to said towing assembly;
a cable release assembly coupled to said fitting, said cable release assembly having a pin, said pin having a first position in engagement with said rope loop and a second position out of engagement with said rope loop; and
means to move said pin from said first position to said second position.

16. The catapult as set forth in claim 15 wherein said cable release assembly further includes:
a cable coupled to said pin; and
a foot pedal coupled to said cable such that when said foot pedal is depressed, said cable moves said pin to said second position.

17. The catapult as set forth in claim 16 comprising:
a pulley mounted on said second end of said rail;
at least one bungee cord attached to said towing assembly and extendable to said second end of said rail and about said pulley and at least partially back to said first end of said rail; and
means to secure said at least one bungee cord to said fitting at said first end of said rail.

18. The catapult as set forth in claim 17 wherein said means to secure said at least one bungee cord to said fitting at said first end of said rail comprises:
a notch on said fitting; and
a cord attached to said at least one bungee cord, said cord having a plurality of spaced apart knots larger than said notch;
such that said cord can be used to apply a tension load to said at least one bungee cord and the cord can be attached to said fitting by placing said cord in said notch.

19. The catapult as set forth in claim 18 wherein support means for supporting said rail above the ground at various upward angles includes:
said second end of said rail includes a pair of telescoping support members; and
said fitting includes a stake for driving in the ground.

20. The catapult as set forth in claim 19 comprising:
said rail composed of a plurality of hollow interlocking segments; and
an elastic cord mounted within said interlocking segments and attached to said first and second ends thereof for releasably hold in said segments in said interlocking position;
such that said segments can be pulled apart and folded.

21. The catapult as set forth in claim 15, including said aircraft towing assembly having a platform for supporting the aircraft as said towing assembly moves from said first end to said second end of said rail.

22. An aircraft catapult assembly for launching an aircraft comprising:
   a rail having first and second ends and a longitudinal axis;
   a support system for supporting the rail above the ground at an inclined angle that is adjustable;
   an aircraft towing assembly movably mounted on the rail, the towing assembly movable from the first end to the second end of the rail;
   an attachment device for releasably connecting the leading edge of the wings of the aircraft to the aircraft towing assembly such that as the aircraft towing assembly is moved from the first end of the rail to the second end, the aircraft is towed there along and released when the towing assembly reaches the second end of the rail;
   a locking device to releasably hold the towing assembly at the first end of the rail;
   a biasing assembly for urging the aircraft towing assembly toward the second end of the rail; and
   such when the locking device releases the aircraft towing assembly, the towing assembly is moved from the first end to the second end of the rail and the aircraft is moved along therewith and is released by the attachment device.

23. The catapult as set forth in claim 22, wherein the aircraft includes a longitudinal axis and further includes left and right wings, the attachment device comprising:
   first and second wire loops mounted on the leading edge of the left and right wings of the aircraft; and
   first and second hooks mounted on the aircraft towing assembly for releasably engaging the first and second wire loops.

24. The catapult as set forth in claim 22, further comprising:
   an aircraft container having an open end for releasably mounting the aircraft directly therein, the container mounted to the first end of the rail on the same longitudinal axis as the rail and wherein the container inclines with the rail.

25. The catapult as set forth in claim 24, wherein:
   the aircraft container is releasably mounted to the rail; and
   the first end of the rail includes a fitting comprising a fastening assembly for releasably attaching the container thereto.

26. The catapult as set forth in claim 22, wherein the first end of the rail includes a fitting having a vertical member for driving in the ground for locking the rail in place.

27. The catapult as set forth in claim 22, wherein the locking device includes:
   a foot pedal coupled to the locking device such that when the foot pedal is depressed, the towing assembly is released.

28. The catapult as set forth in claim 22 wherein the biasing assembly comprises:
   a pulley mounted on the second end of the rail; and
   at least one bungee cord attached to the towing assembly and extendable to the second end of the rail and about the pulley and at least partially back to the first end of the rail.

29. The support system of the catapult as set forth in claim 22, wherein the support system includes a plurality of telescoping support members that adjustably support the second end of the rail.

30. The catapult as set forth in claim 22, wherein:
   the rail comprises of a plurality of hollow interlocking segments; and the catapult further comprises:
      an elastic cord mounted within the interlocking segments and attached to the first and second ends thereof for releasably holding the segments in an interlocking position, such that the segments can be pulled apart and folded.

31. A catapult for launching an aircraft comprising;
   a rail assembly having first and second ends and a longitudinal axis;
   a support system for supporting the rail assembly above the ground at an inclined angle;
   an aircraft container having an open end for releasably mounting the aircraft directly therein, the container mounted directly to the first end of the rail at the same inclined angle as the rail; and
   a launching assembly to extract the aircraft from the container and move it from the first end to the second end of the rail assembly and release it when reaching the second end.

32. An aircraft catapult assembly for launching an aircraft comprising:
   a rail having first and second ends and a longitudinal axis;
   a support system for supporting the rail above the ground at an inclined angle that is adjustable;
   an aircraft towing assembly movably mounted on the rail, the towing assembly movable from the first end to the second end of the rail;
   an attachment device for releasably connecting the aircraft to the aircraft towing assembly;
   the rail being composed of a plurality of hollow interlocking segments; and
   an elastic cord mounted within the interlocking segments and attached to the first and second ends thereof for releasably holding the segments in an interlocking position, such that the segments can be pulled apart and folded.

* * * * *